June 26, 1962 J. J. HORAN 3,041,536

"PANCAKE" METERS

Filed Dec. 26, 1958 7 Sheets-Sheet 1

INVENTOR.

BY JOHN J. HORAN

June 26, 1962 J. J. HORAN 3,041,536

"PANCAKE" METERS

Filed Dec. 26, 1958 7 Sheets-Sheet 2

INVENTOR.

BY JOHN J. HORAN

INVENTOR.
BY JOHN J. HORAN

INVENTOR.
BY JOHN J. HORAN

"PANCAKE" METERS

Filed Dec. 26, 1958 7 Sheets-Sheet 5

INVENTOR.

BY JOHN J. HORAN

FIG. 19 FIG. 18
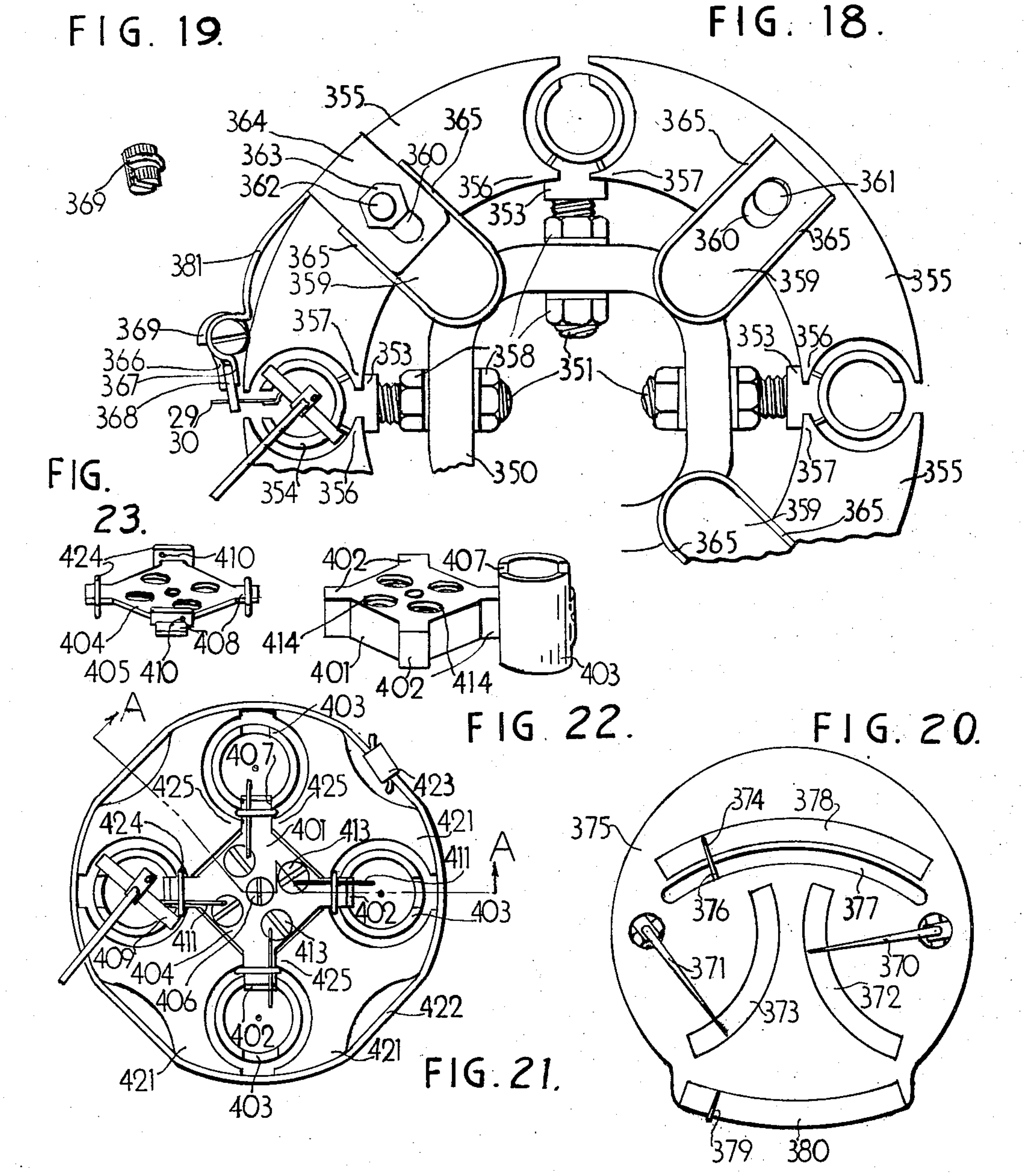
FIG. 23, FIG. 22, FIG. 21, FIG. 20
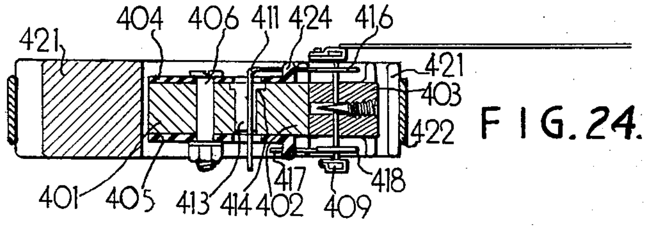
FIG. 24
INVENTOR.
BY JOHN J. HORAN

INVENTOR.
BY JOHN J. HORAN

United States Patent Office 3,041,536

Patented June 26, 1962

3,041,536
"PANCAKE" METERS

John J. Horan, 420 Quigley Ave., Willow Grove, Pa.

Filed Dec. 26, 1958, Ser. No. 783,065
15 Claims. (Cl. 324—151)

This invention relates to visual meters for displaying values of electrical signals. It relates particularly to the general class of such instruments which have succeeded the original D'Arsonval movement. These instruments, as available commercially, are unwieldy and have not kept pace with efficient design in allied fields, such as electronics, with the result that special wasteful space provisions are commonly made for the meters necessarily included in electrical equipment.

The primary object of this invention is to provide compact electrical meters without the sacrifices of accuracy and resolution that result from resorting to small diameters and small scales.

An object of this invention is to reduce the thickness of panel type meters so as to afford more room for other equipment and for ventilation behind the panel.

An object of this invention is to provide meter movements and scale assemblies having overall thickness comparable to the thickness of the magnet assembly itself.

An object of this invention is to provide edgewise meter movements no thicker than necessary to allow for a slender scale.

An object of this invention is to provide edgewise meter movements that can be stacked axially to effect maximum data presentation in the minimum allowable space.

An object of this invention is to provide "panel" type movements which may be fitted compactly against the panel of an electrical instrument without need for large movement clearance holes in the panel.

An object of this invention is to provide inventive adjustment means for thin movements that will afford utmost compatibility with their employment as stacked or panel meters.

An object of this invention is to realize the above objectives while effecting maximum simplicity of meter movement and overall meter design.

An object of this invention is to realize the above objecives while retaining maximum parts compatibility and interchangeability in lines of panel and edgewise meters for the purpose of increasing production efficiency and keeping down cost per meter.

An object of this invention is to provide meters of maximum quality-to-cost ratio.

Under the driving force of a desire to product really thin meters and to do so without sacrifice of sensitivity and accuracy, a whole series of novel and inventive concepts have been discovered. Taken separately, each has merit in producing size reduction. Taken together and coordinated in the optimum manner, they product a new result, the true "pancake" meter.

Examination of meters in the present day art indicates that design practice among virtually all manufacturers is quite similar. Nearly all panel type D'Arsonvals have a "birdcage" structure above and below the coil assembly to maintain mechanical alignment and to provide for pivot, zero and sensitivity adjustments as well as to permit electrical connection to be made to the coil. This "birdcage" assembly usually enforces increasing the overall movement thickness to at least three times the thickness of the magnet assembly. This wastefulness in design is further aggravated by the use of thick plastic cases and heavy binding posts or studs that are a design carryover from the days when such studs were the common means of interconnection with binding posts on batteries, switches, terminal blocks, etc.

The result has been that a meter having an overall thickness of less than 1½ to 2 inches is a rarity, except among the cheapest movements employing no jewelled pivots.

Patent applicants are prone to claim that their inventions reduce costs of manufacture. While the primary object of this invention is not the reduction of cost of production of the meters themselves, the means employed to modernize the meter art are such that the numbers of components, particularly precision components, are drastically reduced, and assembly operations, particularly those involving use of magnifying glasses, are greatly simplified with consequent reduction in cost.

Reduction in overall thickness of the movements opens up a whole new field for exploitation of edgewise meters. The use of meters with edgewise scales is not in itself new. However, to date, the edgewise meter, as distinguished from the panel meter, since it is generally so thick, offers comparatively little economy of panel space. But if the edgewise meter can be reduced in thickness, including case, to ½ inch, ⅜ inch, or even less, the space economy becomes very real.

If the edge wise meter movements can be practically stacked so that separate mountings for each movement are unnecessary, the saving in data presentation area is dramatic. A popular size of panel meter, having a 3½ inch diameter flange, affords a 2½ inch maximum curved scale length. The geometry of meter placement is such that over 12 square inches of panel space must be sacrificed for each ¼" by 2½" scale. If properly designed edgewise meters could be stacked together, 12 square inches would be enough to display 8 to 12 of them side by side. Moreover, with proper color coding, these multiple parallel scales would be susceptible to much faster reading and more effortless comparative monitoring by the observer. The availability of these slim "pancake" type meters introduces new vistas in design of cockpits and flight engineer's compartments in aircraft, at a time when the growing complexity of aircraft has rendered it mandatory to reduce both the frontal area and volume of aircraft data presentation systems and to simplify the efforts required of those who use them.

Other objects and advantages of this invention will appear in the following description and in the drawings of which:

FIG. 18 is a considerably enlarged plan view of a multi-movement meter array in accordance with this invention.

FIG. 19 is a view of the cam adjustment means employed in FIG. 18;

FIG. 20 is a view of a scale face for the movement array of FIG. 18;

FIG. 21 is a plan view of another multi-movement meter array;

FIG. 22 is a view of the central cross of FIG. 21 with one core assembled thereto;

FIG. 23 is a view of one of the insulating crosses of FIG. 21;

FIG. 24 is a sectional view AA of the meter array in FIG. 21;

Figures 1, 4, 5:
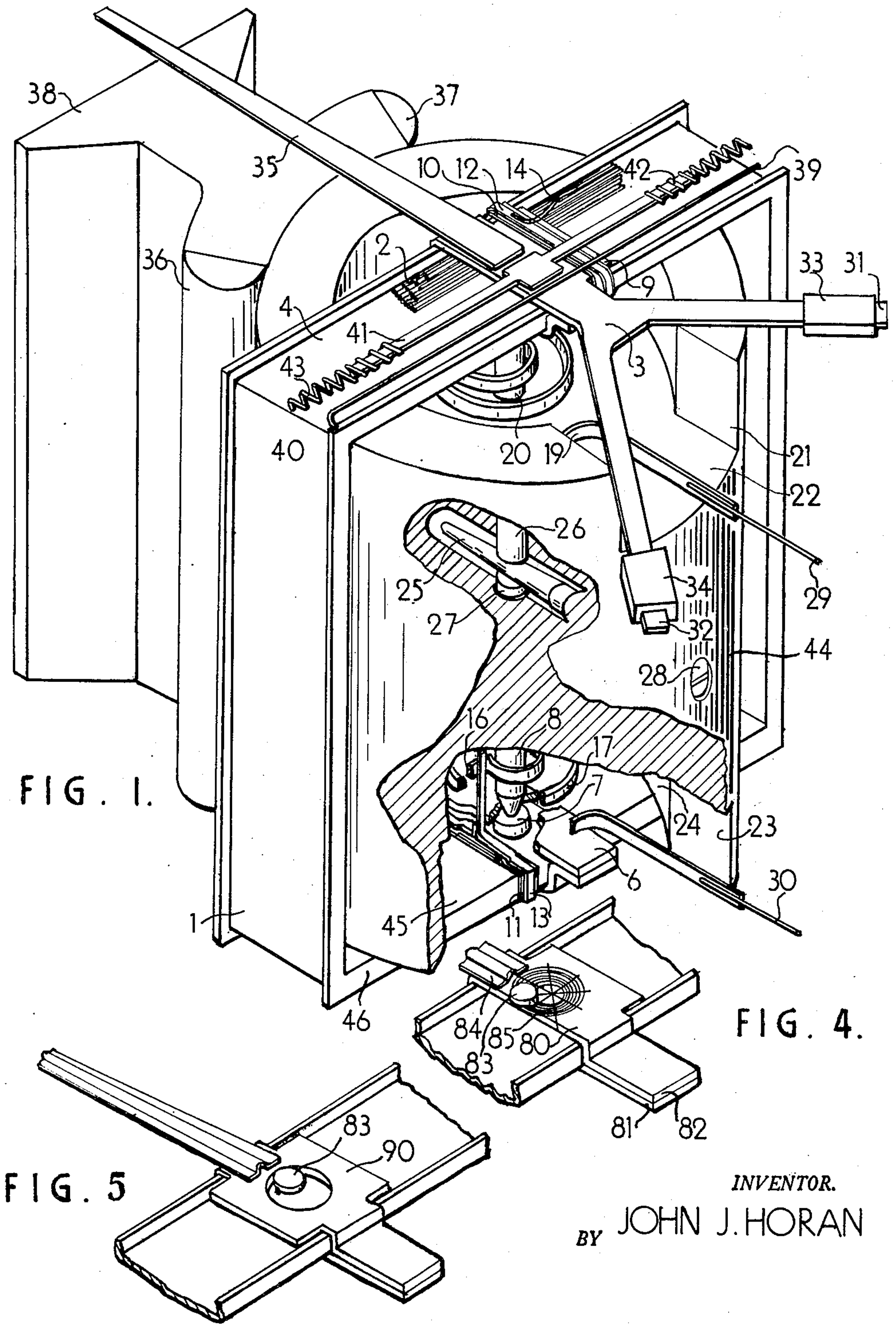
FIG. 1 is a partially cutaway view of a preferred embodiment of a coil-core assembly for a meter showing a space-saving construction of this critical component assembly and unique adjustment means.
FIGS. 4 and 5 are two fragmentary views of two more extremely novel and compact alternative balancing means.

Referring now to FIG. 1, there is shown a coil frame 1, preferably fabricated from aluminum alloy, which serves in conventional fashion as a shorted turn for damping purposes. Only a portion of the conventional coil 2 itself is shown in order to eliminate confusion of detail. The upper clamp 3 consists of a flat strip of metal bent around the upper leg 4 of the coil frame, with the lower terminus of the clamp spotwelded to the upper end. The lower clamp 6 is similarly wrapped around the lower leg 45 of the coil frame and is also spotwelded at its termini. Both clamps 3 and 6 are used to perform generally similar functions in that both serve as retainers for the coil 2 and for jewels 7. Only the lower jewel 7 can be seen under the cutaway portion of clamp 6, where it bears against the pointed end of lower pivot 8. The hidden tip of upper pivot 20 likewise bears against the upper jewel. Both clamps are equipped with short projections 9 on the outer surface, the projection of the lower clamp 6 not being visible. Upper and lower plastic bands 10 and 11 are wrapped around the upper and lower legs 4, 45 of the coil frame, covering the projections 9 of the upper and lower clamps 3, 6 respectively, providing thereby electrical isolation for the upper and lower connector bands, 12, 13, respectively. The upper connector band 12 provides a connection point for wire 14, one of the coil termini, which is soldered or welded to it. The lower connector band likewise provides a connection point for the opposite terminus (not shown) of the coil 2. The two ends of the connector band 13 are soldered or welded, one projecting end 15 being soldered or welded to the inner end 16 of torsion spring 19. The similar juncture of the ends of the upper connector band 12 is hidden below the upper arm 4 of the coil frame, as is the juncture between the projecting end of the band and the inner end of the upper torsion spring 19.

It will have been noted that torsion springs 17 and 19, instead of being external to coil frame 1, are, like the pivots 8, 20, internal, space for spring clearance having been recessed into the upper and lower ends of core 44. The recessed surfaces of the core 44, as exemplified by areas designated 21, 22, 23 and 24, and the nearby surfaces of the pivots 8, 20, are painted or coated with insulating material, of which a great many suitable varieties are available, such as phenolic resins, vinyl resins, etc., so that even in the event of physical damage to the meter the current carrying springs 17, 19 cannot short circuit to ground. Pressure adjustment of pivot 8 against jewel 7, as well as of pivot 20 against its corresponding jewel, is by means of the tapered screw 25 bearing against the inner ends 26, 27 of pivots 20, 8, respectively. The elasticity of the coil frame 1 and of its legs 4, 46 keeps the pivot pressure, when properly adjusted, from becoming excessive. Screw 25 may be adjusted at its slotted head 28, visible at the cylindrical face of core 20.

Stiff but slender current-carrying connecting pins 29, 30 are preferably spotwelded to the outer legs of springs 19, 17 respectively. As will again be seen later, these pins 29, 30 serve also as zero-set adjustment arms. When both pins, 29, 30 are fitted into the same zero adjustment means, as I prefer, an easy matter with this invention as distinct from the prior art, lesser movement of the adjustment means is necessary to accomplish an equivalent deflection of the needle because torsion is applied to the coil frame via both springs at once. In order to provide zero adjustment, the pins 29, 30, may be shifted either laterally or axially through the limited distance required. Deflection may, of course, be applied to only one spring as generally in the prior art; however, it is undesirable to do so because the spring torques are thereby unbalanced.

Additional functions are performed by the upper clamp 3. It will be seen that its upper end continues in two balancing arms 31, 32, angularly disposed with respect to each other and with respect to the main portion of the upper clamp 3. These arms 31, 32, carry weights 33, 34 respectively. These two weights and arms perform the same static balancing function that three sets of weights and arms perform in conventional meters. When balancing the principal movement of the indicating arm 35 both weights are advanced or retarded an equal amount. If lateral unbalance is found, this unbalance is corrected by advancing one weight and retarding the other an equal amount. This method of adjustment completely eliminates the necessity for adherence to the conventional practice of locating the lateral balance weights above the coil, thereby contributing further to the reduction of assembly thickness and moments acting upon the pivots.

The upper clamp 3 also serves as a mount for the needle or indicator 35 which is cemented in place. The indicator 35 may be of much lighter construction than in conventional meters, because the only force acting upon it is due to its own inertia. It is not called upon to strike any stops in the event of overtravel of the coil. As is well known, any reduction of needle inertia contributes to the sensitivity and accuracy of the movement. In the event of overtravel, the coil frame 1, which must always be strong in order to resist compressive forces in coil winding, strikes cushions 36, 37, which are preferably, though not necessarily, of silicone rubber, and which are which are strategically and inventively bonded to core bracket 38 in way of the path of coil travel.

For economy in manufacture, the core bracket 38 is preferably a segment of a non-ferrous extrusion which has preferably first been brazed to an iron rod as a continuous length, prior to cutting of the two-element brazed bar into segments, after which the recesses are machined in the iron core 20. This core bracket 38, as will be seen later, provides inventive means for mounting the core to the magnet assembly without the use of yokes, clamps, etc. which have imposed growth in overall thickness of the meter assemblies in the prior art.

Detail 39 is a flux leaker of ferromagnetic material, spot-welded, soldered, or otherwise bonded across the top surface of clamp 3. This flux leaker 39 affords an inventive means of changing the sensitivity of a meter movement. It is particularly applicable when a single magnet assembly must supply the necessary flux for a plurality of meter movements. Since it is always parallel to the direction of the moving coil 2, it exerts its maximum effect in the direction of the coil 2 only. Therefore it causes less flux transmission via itself than would any other means of flux leakage adjustment having equivalent effect on the sensitivity of the movement. As a consequence, adjustments of the sensitivity of one movement have a minimum effect upon other movements. Adjustment of flux leaker 39 may be performed by bending it slightly at its tip as has been done at the left end 40 of the flux leaker 39. This increases the distance between the terminus of the flux leaker and the pole faces surrounding the air gap.

Detail 41 is an alternative form of adjustable flux leaker. Like flux leaker 39, flux leaker 41, of ferromagnetic material, is bonded to the upper clamp 3. It terminates in two helical wire flux leakage adjusters 43, 43, also of ferromagnetic material. The two flux leakers, shown here for illustration, would normally not be used in combination with each other. It will be seen that the construction of flux leaker 41 resembles that of balancing weights used in older movements, but the purpose and functions are entirely new. To preserve mechanical balance, the movements of one adjustment must be equal to that of the other.

Figures 2, 3:
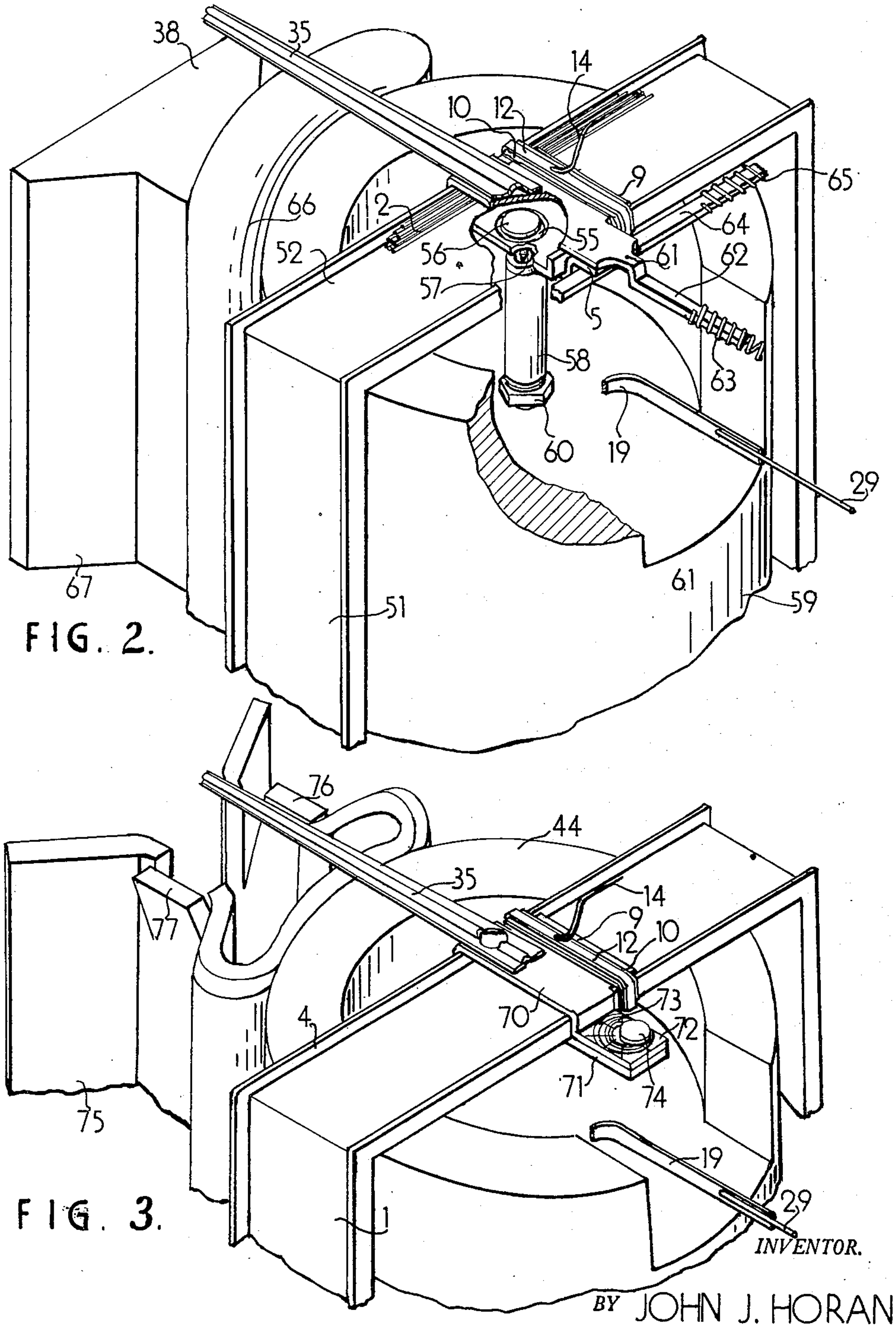
FIG. 2 is a cutaway partial view of another preferred embodiment of a coil-core assembly for a meter.
FIG. 3 is a fragmentary view of a preferred embodiment of a coil-core assembly showing extremely compact and novel balancing means.

Referring now to FIG. 2, there will be seen some alternative embodiments in the coil core assembly in accordance with this invention. Detail numbers repeated from FIG. 1 are substantially unchanged. Certain others differ only slightly. The upper and lower legs 52 of the coil frame 51 are dimpled 55 inwardly very slightly at their centers to admit the heads of pivots 56 which protrude inwardly to mate with jewels 57 secured to the ends of support pins at least one of which 58 is preferably threaded (the other, which is not shown, may be press fitted) to screw into the core 59, jam nut 60 being used to lock it in adjustment. The end surface 61 of the core 59 is recessed somewhat more deeply than the corresponding surface in FIG. 1, to permit wrench access below the spring 19, which has been cut away to eliminate repetitive detail and permit clearer presentation. As in the previous instance all core surfaces at both ends are coated with insulating material. The pivot 56, because of the dimpling 55, does not protrude above the surface of the leg 52 of the coil frame 51. Therefore, its head may be cemented or otherwise bonded to the leg 52 prior to winding the coil 2 which firmly locks it in place. If desired, a thin shim (not shown) may be bonded in place beneath the coil windings over the head of the pivot 56 to present a still more even surface.

The upper clamp 61 terminates in a balance adjusting arm 62 equipped with a helical adjuster 63; and a transverse balance adjusting arm 64, cut away at the left end for clarity, is equipped with a pair of adjusters 65, only the right one being shown. It is spotwelded, soldered, or otherwise bonded to the underside of clamp 61 for maximum compactness.

Motion of the coil frame 51, in the event of overtravel, is arrested by the snubber 66, an elastic band which is slipped over the inner end of the core bracket 67 and which serves as a coil stop and shock absorber.

It is desirable (although usually difficult) to reduce the weight of the needle because of the effect of its moment of inertia. Yet conventional practice requires that the needle (or some other specially built projection of the assembly) be strong enough to withstand repeated impacts with overtravel stops located at a distance from the coil. In the construction of this invention, the needle may be made of very light and thin material because no such duty is imposed upon it. Its only stresses are due to its own weight and inertia. The duty of arresting overtravel is placed where it can best be handled, in the coil frame 51 and the snubber 66.

Again in conventional practice, the transverse balancing arm is located above the center of the coil, adding unnecessary height. What is more, its weight is not applicable to the counter balancing of the weight of the indicating arm. In this invention the transverse balancing means is located behind the coil, adding nothing to the height of the assembly and at the same time contributing a counter-balancing moment against the weight of the very light but long indicating arm 35. Thus the magnitude of the weights and, therefore, the inertia of the coil assembly diminishes to a value far smaller than in conventional production meters. In fact, the transverse balancing means may easily contribute all of the needle counter balance, permitting further shortening of arm 62 and adjuster 63 and leaving them no function except to compensate for irregularities in the distribution of the coil turns and for tolerances in the location of the pivots with respect to the coil frame. In such event, slight bending of the transverse balancing arm might be employed as the adjustment method for longitudinal unbalance. Thus the significance of the locations of the snubber and of the off-center shaft of the transverse counterbalancing means extends far beyond the reduction of overall assembly height. It extends particularly to the increase in sensitivity achievable through reduction of the overall moment of inertia and to the improved resistance to blurring of the needle due to vibration and the faster response of the system to change in the value of electrical impact.

Referring now to FIGURE 3, there is shown a fragmentary view of a coil-core-bracket assembly, similar to that of FIGURE 1 except for certain changes in the upper clamp and balancing arrangement and the core bracket and for the omission of other detail. The upper clamp 70 is again wrapped around the upper leg 4 of the coil frame as a means of retention of the wiring (not shown except for terminus 14). The lower limb 71 of the upper clamp projects in a direction opposite that of the needle for counterbalancing purposes, as does the upper limb 72. The upper limb 72 has been bent around the leg 4 to meet the lower limb 71, to which it is spotwelded. A grid scored surface 73 is provided on the upper surface of the limb 72. A micropuck 74 is provided of such a weight as, in combination with the weights of limbs 71 and 72, to balance, theoretically, the weight of the needle 35 when the micropuck 74 is located in the approximate center of the grid 73. A very thin coating of a tacky quick-drying clear solventless resin, containing no volatiles, is placed on the grid. With the micropuck located in the approximate center of the grid 73, the assembly is tested for unbalance and the micropuck 74 is shifted to correct the unbalance, the resin then being permitted to set and bond the micropuck 74 in place. It will be seen that this balancing means adds no height to the assembly.

The core bracket 75, instead of being an extrusion, is a non-ferromagnetic roll-form brazed to the core 44. Staking tips 76, 77 are partially sheared at the top and bottom (bottom not shown) of the core bracket 75. These staking tips are intended to be swaged over upon assembly between the chamfered tips of the pole faces to be shown in subsequent figures and thereby to reduce or eliminate need for soldering the core bracket 75 in place between the pole faces.

Referring now to FIGURE 4, there is shown a similar upper clamp 80 having projected limbs 81, 82 that theoretically balance the weight of the needle 84. A grid 85 is provided on the upper surface of clamp 80. The micropuck 83 is to be shifted about this grid for balancing the movement in the same manner as was described for FIGURE 3.

In FIG. 5 the clamp 90 has been punched out so as to permit setting of the micropuck 83 directly on the coil so as to eliminate the height contributed by it in the previous figure. The lines of the coil wires (not shown this time) provide reference marks for setting the micropuck 83 longitudinally. Other means may be provided for lateral reference marks including the use of a grid-ruled reticule in the microscope used by the operator.

Figures 6, 7, 8, 9, 10:
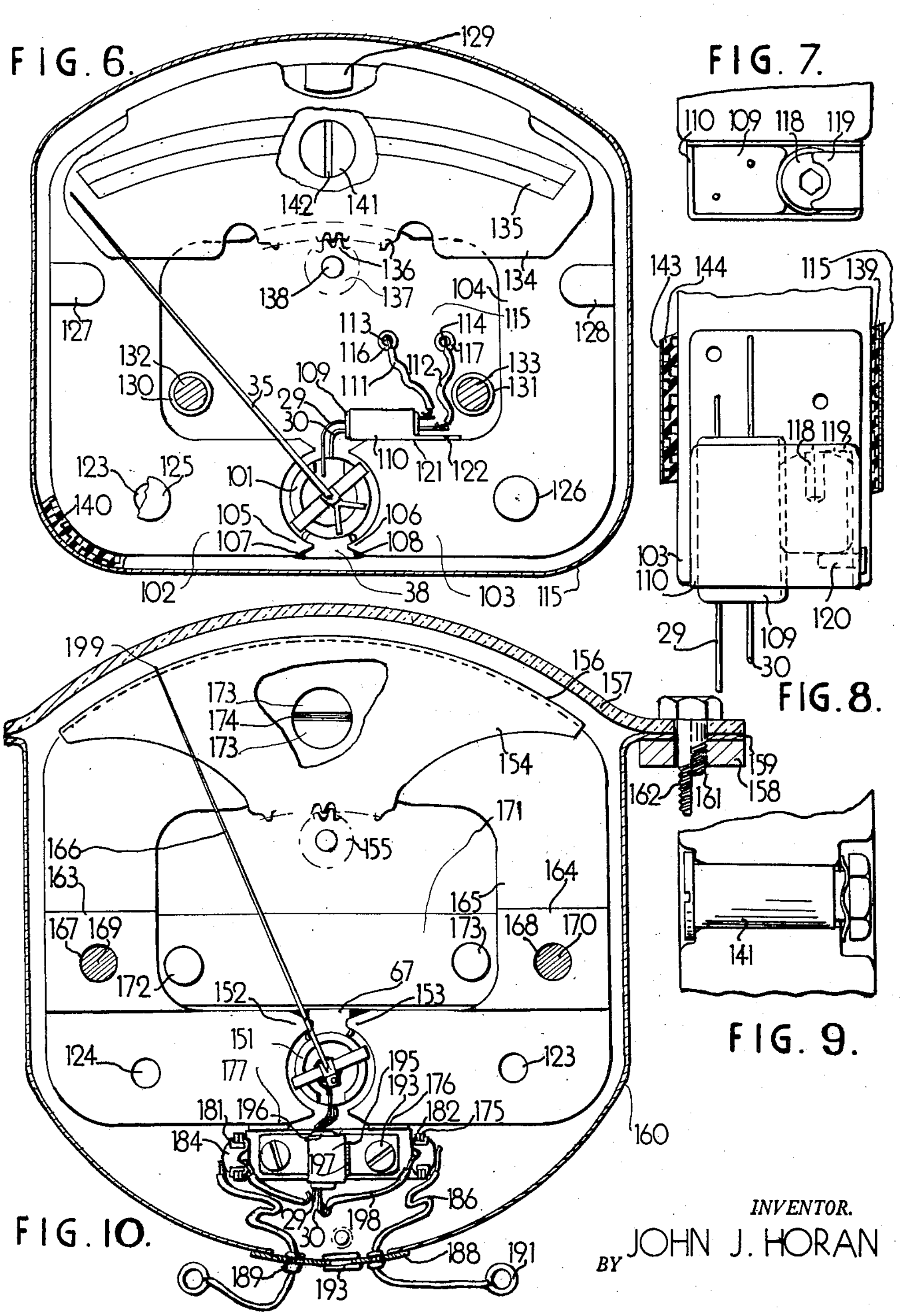
FIG. 6 is a view of a panel meter assembly advantageously employing compact coil-core constructions and unique adjustment means.
FIGS. 7, 8 and 9 are fragmentary views of certain portions of the assembly shown in FIGURE 6.
FIG. 10 is a view of a stackable meter assembly having an edgewise scale and advantageously employing compact coil-core constructions and unique adjustment means.

Referring now to FIG. 6 and fragmentary views in FIGS. 7, 8 and 9, of a panel meter embodiment, a coil-core-bracket assembly 101, such as one of those shown in prior figures, is secured in place between the pole faces 102, 103 of a "horseshoe" permanent magnet 104, the core bracket being a press fit between the pole face tips 105, 106. Bonding material, which may be solder or plastic, the latter preferably of a thermosetting material, is used to tack the core bracket 38 permanently in place. In this embodiment the connecting pins 29 and 30, which are of a stiff hardened alloy, such as Phosphor bronze, and which carry the current to the springs (not shown to avoid unnecessary repetition of detail) in the coil-core assembly, are bent for alignment with the nylon slide 109 adapted to slide parallel with the direction of the pole faces within slideway 110. As the slide 109 moves to the left in FIG. 6, the stiff press-fitted pins 29, 30 apply winding force to the springs, and when it moves to the right the tension is lessened. Thus, the slide serves as a means of zero adjustment of the position of the needle 35. The pins 29, 30 have been press fitted into the holes shown in the slide in FIG. 7 and travel entirely through these holes, making welded or soldered connection with insulated wire leads 111, 112. These leads in turn are soldered to rivet terminals 113, 114 secured to the base cover 115 from which they are insulated by grommets 116, 117.

The position of the slide 109 is governed by the rotation of the internal-wrenching screw 118 which is trapped within the slideway 110. The flanged-over end 119 of the slideway 110 serves as one longitudinal travel stop for the screw 118; and the rivet 120, the head of which is spotwelded to the slideway 110, serves as the stop against travel in the opposite direction. During assembly the screw is first slipped into the slideway and then is rotated as the unthreaded slide 110 is forced in; the screw thus wedges itself against the side of the nylon slide 110, forming a partial thread by which the slide is forced all the way in by continued rotation of the screw, a tight, non-slip, positioning fit of the slide thereby being assured. By means of solder 121 or other bonding material, the slideway 110 is secured to the inner surface of the leg 122 of the magnet.

To reduce the concentration of flux at the centers of the pole faces, and thus to improve the linearity of the movement, two flux spreader holes 123, are cored in the magnet. These holes provide suitable locations for spacer pins 125, 126 which may be of non-ferrous metal, or possibly of rubber or other shock absorbing material, which may optionally serve in place of shock pads 139, 144 to cushion assembly between the back cover 115 and the front cover 143 and thus provide the minimum clearance required for non-fouling travel of the indicator needle 35. Other cooperative and/or alternative means for providing this spacing are also shown. These include the cast-in bosses 127, 128, 129 and the spacer tubes 130, 131 positioned around assembly screws, 132, 133. Of course, not all of these spacing means need be employed for any one movement.

The dial face 134, which carries the graduated scale 135, is of wrap-around design and internally geared 136 to show an additional basis for zero adjustment of this type of movement. The pinion 137 is mounted on adjustment shaft 138 which is secured to the base cover 115. The pinion is loosely meshed with the internal gear to permit relative motion between the movement and the case during vibration. Other means of preventing relative motion from disturbing the adjusted position of the dial face include loose keying of pinion 137 on shaft 138 and provisions for mounting the pinion assembly on the magnet 104 instead of the base cover 115.

For applications where vibration isolation of the movement from the case is desirable, resilient damping material 139, 140, 144 of rubber, plastic or paper is provided.

Sensitivity adjuster 141 is a transversely magnetized cylinder inserted into a cored and ground hole in the magnet 104. The interior hole surfaces may be filled and smoothed with a liner of powdered iron with a plastic binder. A screw slot in one end of the cylinder 141 permits it to be adjustably rotated. The magnetized cylinder 141 is normally inserted so that its polarity enhances the flux or the magnet 104. Reduction of the amplitude of needle excursion at full scale is accomplished, after assembly and zero adjustment, by rotation of the transversely magnetized cylinder 141, producing a local flux line distortion that desensitizes the movement.

Figure 11:
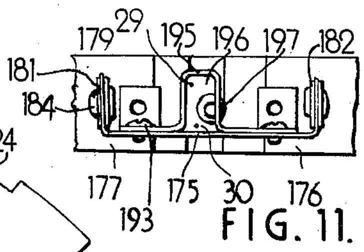
FIG. 11 is a fragmentary view of a portion of the assembly shown in FIGURE 10.

Referring now to FIGS. 10 and 11, there are shown two views of a somewhat similar embodiment of this invention intended primarily as an edgewise meter, and therefore suitable for side-by-side scale arrangement when used in multiples, that is, "stacking the D'Arsonval."

Any coil-core bracket assembly of this invention might have been chosen, however the one shown 151 is that of FIG. 2, with the upper clamp modified as shown in FIG. 3 and the indicator arm 166 extending full length and terminating in a right angle bent tip 199 reaching across the edgewise scale face 156. The assembly is generally similar in principle to that shown in FIGS. 6, 7 and 8, however it has been arranged to facilitate the making of adjustments in a stacked assembly. The core bracket 67 is secured to the inward tips 152, 153 of the pole faces instead of the outward tips as in the previous embodiment. The scale plate 154, again of the wrap around type, may be shifted by means of pinion 155. Optionally pinion 155 may be replaced by a tool adapted for adjustment of any scale in the stack. The dial is imprinted on the scale-face edge 156 of the scale plate 154 under the transparent window 157, which may be of glass or plastic and which is secured to reinforcement 158 of the flange 159 of the case 160 by screws 161. Holes are provided in window 157, reinforcement 158 and flange 159 for mounting screws 162.

Spaced assembly of stacked movements is provided for by raised bosses 163, 164, cast or molded on magnet 165, clearance being allowed between them for travel of the indicator needle 166. The cored holes 167, optionally provided, permit use of stack bolts 169, 170. Optionally clamp plates 171 may be provided at both ends of the stack of movements, in which case the stack bolts 169, 170 would pass through the holes 172, 173 in the clamp plate 171.

The sensitivity adjuster superficially resembles the one described in connection with the previous movement. However its material, construction and theory of operation are different. It comprises two identical segments 173 of ferromagnetic material having moderate permeability and low remanence with a "sandwich filler" 174 of non-ferrous material. When the the adjuster is aligned as shown in FIG. 10, the movement is adjusted for maximum sensitivity. When the the adjuster is rotated slowly by inserting a non-ferrous tool in the end slot, the sensitivity falls off, the sandwich filler 174 serving the same function as an air gap. Minimum sensitivity occurs when the filler 174 lies at right angles to the direction of flux.

The connection bracket 175 performs several functions. It is of non-magnetic material and is soldered or otherwise bonded to the outer surfaces 176, 177 of the pole faces across the gap. Its two upwardly turned ends are each equipped with rivets 184, which are insulated from these ends by ferrules 181, and washers 182. The heads of the rivets 184 serve as solder posts for the termini of insulated external lead wires 186, which pass out through the access cover 188 via grommets 189, and end in ring termini 191, adaptable either for soldering or for assembly to a binding post on a terminal block.

Connection bracket 175 also serves as a mount for zero adjustment of needle position. Secured to it by screws 193 is the adjustment housing 195. Inside the pocket of the adjustment housing are the slide 196 and the slide screw 197. These parts operate in the same manner as the slide 109 and screw 118 of the previous embodiment. However, the movement of the slide 196 is normal to instead of parallel to the line of alignment of the pole faces. In this case the connection pins 29, 30, which have been press fitted into the slide 196, move inwardly to slacken spring tension and outwardly to increase it. Internal leads 198 spot welded or soldered to the outer termini of connection pins 29, 30, bring current from rivets 184. Screw 197 is restrained against longitudinal motion by the ends of the slot in the adjustment housing 195, through which a portion of the screw 197 projects. Optional flux spreader holes 123, 124, perform the same function as in the previous embodiments.

Figure 12:
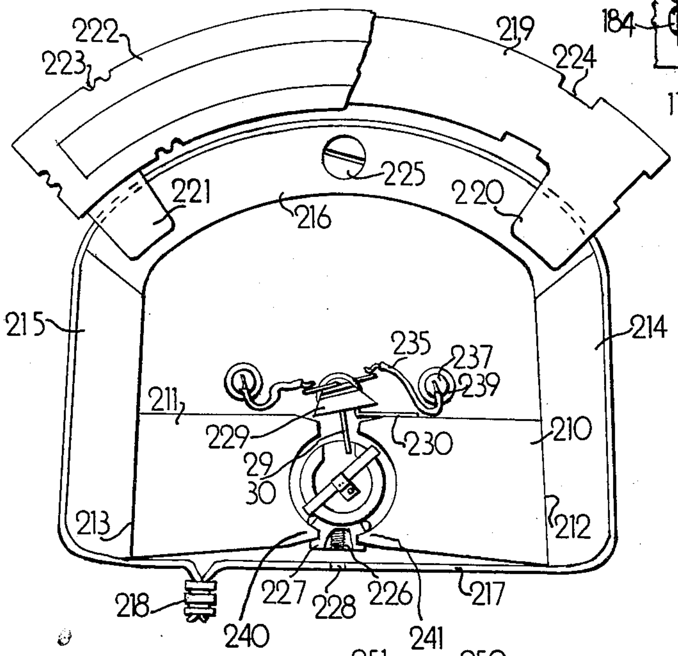
FIG. 12 is a view of a panel meter assembly employing the compact coil-core constructions with novel adjustment means and using a smaller relative proportion of magnetic material in its magnet assembly.
Figure 13:
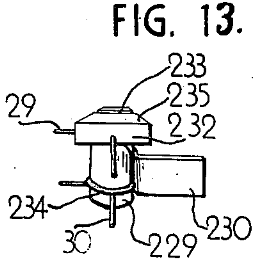
FIG. 13 is a fragmentary view of the zero adjustment means employed in FIGURE 12.

Referring now to FIGS. 12 and 13, there is shown a meter movement using, for illustration, less magnetic material than did the previous "horseshoe" movements. This movement employs twin magnets 210, 211, polarized for symmetrical mechanical arrangement as shown, their adjacent termini serving as pole faces, while their flat ends 212, 213 abut the ends 214, 215 of a "horseshoe" 216 of moderate to high permeability which provides continuity for the flux path. The ends of the magnets may be soldered or otherwise bonded to the horseshoe and/or bound by a continuous strap 217 whose termini are joined by clip 218. Prior to assembly, the permeable horseshoe 216 may have been pre-sprung so as to provide a high-force grip upon the core bracket 227. Alternatively the core bracket 227 may be keyed or soldered between the tips of the twin magnets 210, 211. If interference fits and bonding are adequate, the strap 217, which is non-ferrous, may be dispensed with. The crown of the hoseshoe 216 is recessed slightly on the near face to provide clearance for the thickness of the scale frame 219 and for the thickness of and necessary clearance for the needle (not shown). The dial plate 222 is clipped over the scale frame, the indentations 223 snapping in place in mating recesses 224. Sensitivity adjuster 225 may be of either the transversely magnetized type 141, 142 or the sandwich type 173, 174, as disclosed in other embodiments above.

The coil-core-bracket assembly, not all details of which are shown, employs the core of FIG. 1, except that the pivot pressure adjusting screw 226 enters via the core bracket 227, permitting access for pivot adjustment via hole 228 in the strap 217.

The zero adjuster 229 is coupled to one magnet 212 by the question-mark-shaped holder 230 soldered or otherwise bonded to it. The zero adjuster 229 is composed of a cylindricial plastic body gripped elastically in the crook 231 of the holder 230 and an enlarged head 232 having a slot 233 adapted to receive a screw driver or other adjustment blade. The connecting pins, 29, 30, are press fitted through holes in the nylon zero adjuster 229 above and below the holder 230, the lower connecting pin 30 being separated from the holder by insulating washer 234. The wing tip extensions 235, 236 of the head 232 serve as zero adjustment stops and prevent over-adjustment by contacting the magnets 212, 213.

The connecting pins, 29, 30 are bent 90° as they emerge from the adjuster, insulated leads 235, being soldered or spotwelded to them. The leads are soldered at their remote ends to rivets 237, which are insulated from the case by washers 239.

Figure 14:
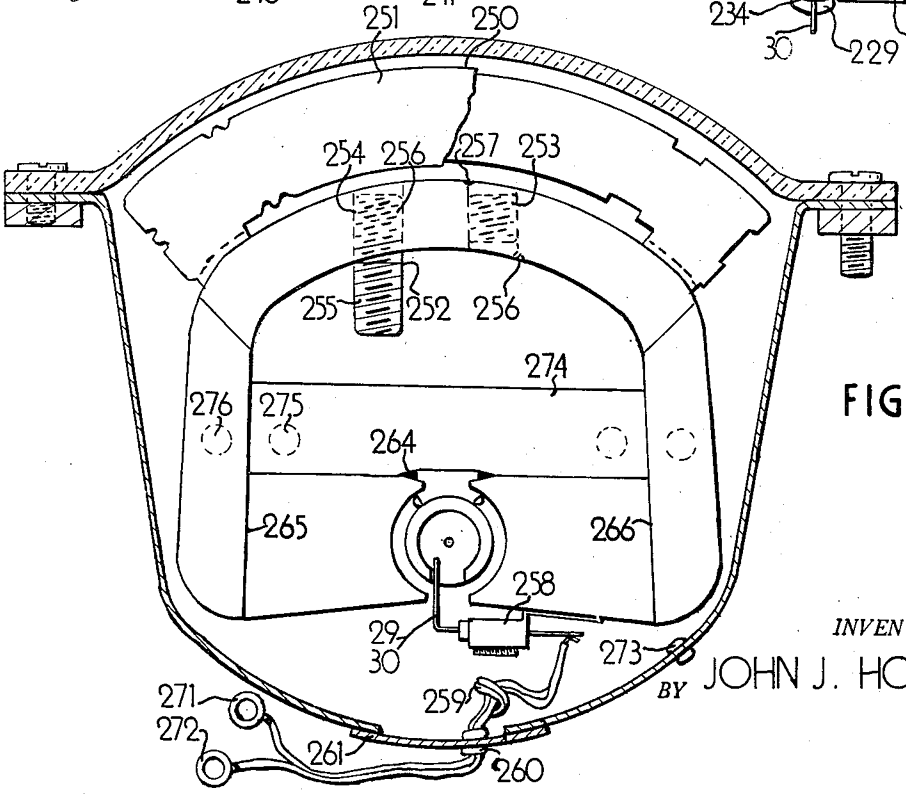
FIG. 14 is a view of a stackable edgewise meter somewhat similar in construction to the panel meter of FIGURE 13 but employing different adjustment means.

Referring now to FIG. 14, an embodiment similar to that of FIGS. 12 and 13 is shown. This movement, however, is more particularly adapted for edgewise or stacked service. The dial 250, therefore, is on the edge of the scale plate 251 and does not appear in the plan view.

Two alternative exterior forms of sensitivity adjuster 252, 253 are shown. Only one would be used actually, however. Sensitivity adjuster 252 comprises two threaded halves 254 and 255 brazed end-to-end. The half 255 that protrudes from the horseshoe is of non-ferrous material such as brass. The half that is engaged within the threads is ferromagnetic and of moderate permeability. Either withdrawal or advance of the assembly from the position shown reduces the effective cross section of the horseshoe and cuts the sensitivity.

Sensitivity adjuster 253 is unthreaded and retained by stakes 256, 257 at opposite ends of the hole in the horseshoe. It may be either of the permanent magnet type shown in FIG. 6 or of the sandwich gap type shown in FIG. 10.

The zero adjuster 258 is similar in direction of motion to that shown in FIG. 6 but it is located outside the magnetic enclosure. It will become clear that adjustment of tension of the springs (omitted together with other details of the coil-core-bracket assembly) may be made by motion of the connecting pins 29, 30 in and out as in FIG. 10 and substantially in FIG. 15, from right to left as in FIGS. 6 and 14 or on a modified right to left path about a remote center of rotation as in FIGS. 12 and 17. Contrary to the methods in the prior art, which permit zero adjustment through only one spring, the arts disclosed here permit the adjustment to be made via both top and bottom springs at once, insuring retention of load balance evenly between both springs. Access to the zero adjustment is via grommet 273.

Connecting pins 29, 30 are soldered or welded to twin insulated lead 259 which is knotted and led through grommet 260 secured in a hole in access cover 261. The twin lead 259 terminates in ring connections 271, 272.

Like the movement previously shown in FIG. 10, this movement may be stacked by several methods, including clamp plate 274 with tension bolts located at either 275 or 276.

Figures 15, 16, 17:
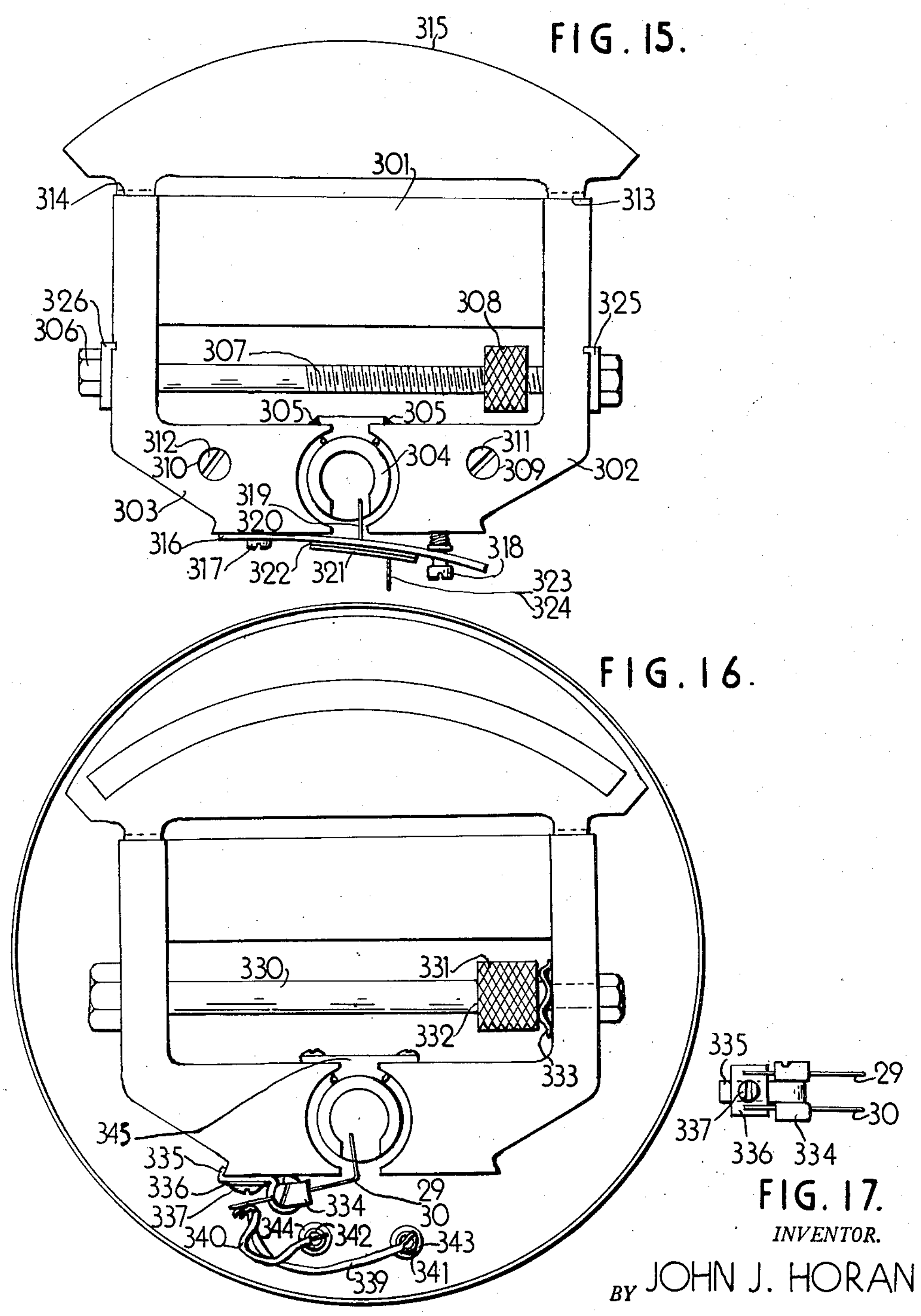
FIG. 15 is a view of a low cost, lower sensitivity movement for a stackable, edgewise-viewed meter employing a compact coil-core assembly and novel adjustment means.
FIG. 16 is a view of a low cost, lower sensitivity panel movement employing a compact-coil-core assembly and novel adjustment means.
FIG. 17 is a fragmentary view of the zero-adjustment means employed in FIGURE 16.

Referring now to FIG. 15, there is seen a movement employing a single plain bar magnet 301, preferably soldered or bonded at its ends to two pole members of ferromagnetic material of moderate to high permeability 302, 303. Coil-core-bracket assembly 304 may be in accordance with any of the embodiments hereinbefore shown and is preferably tacked in place with solder or other bonding material 305. Certain of the details of this assembly 304 are not shown. Bolt 306 may perform a variety of functions. It secures stacking clips 325, 326 in place for spacing and holding meter movements in stacks. It may provide the sole means of overall assembly for single movements that are not soldered together. The extended threads along its shank 307 provide a path for travel of ferromagnetic leakage adjuster 308 which renders the movement less sensitive as it is run up toward mid position.

Flux spreader holes 309, 310 are provided. These may be employed alternatively as openings for linearity adjustments 311, 312 and even as sensitivity adjustments if preferably positioned slightly more distantly from the pole faces. The mounting flanges 313, 314 of dial face 315 are cemented to the remote termini of the pole pieces 302, 303.

The zero adjustment means consists of spring plate 316, anchored at one end to one of the pole pieces 303 by screw 317, and adjustably moved toward the other pole piece 302 by screw 318. This adjustment means does not have cylindrical connection pins, as did the previous embodiments, but employs stiff flat ribbons 319, 320 as connections. These connections 319, 320 nestle between cemented insulator leaves 321, 322. The inner ends project toward the coil springs through holes in the spring plate 316. The external ends 323, 324 are available for connection to external leads such as were described previously.

Referring now to FIGS. 16 and 17, there is shown a movement somewhat similar to that of FIG. 15, except that this one is preferably an embodiment for a panel meter. The bolt 330 is turned to a smaller diameter at the right end; and a transversely magnetized cylinder 331 is slipped over the smaller diameter and against the shoulder 332, being held in place by non-ferrous corrugated spring washer 333. The transversely magnetized cylinder 331 may be rotated so as to regulate the sensitivity of the movement.

The plastic zero adjuster 334 is similar in principle of construction to that described in FIGS. 12 and 13 except for the direction of motion of connection pins 29, 30 which in this case is primarily inward and outward. The adjuster 334 has a slotted elongated head which serves as a stop when it abuts the pole member 344 and thereby prevents short circuiting through excessive rotation in a counterclockwise direction. The plastic insulator 336 is held in position by screw 337 and prevents the remote ends of connecting pins 29, 30 from grounding against the straight portion of holder 335 in the event of excess rotation in the clockwise direction. Insulated leads, 339, 340, spot-welded or soldered to the connecting pins 29, 30, convey current from rivets 341, 342, which in turn are insulated from the case by insulating washers 343, 344. Screws hold the core bracket 345 to the pole members.

Referring now to FIGS. 18, 19 and 20, there is shown a multiple-movement embodiment of the "pancake" meter of this invention. This is a meter particularly adapted for employment in a commercial radio tube tester, as well as certain other devices, its multiple scales permitting simultaneous reading of more than one characteristic of a vacuum tube or of the most important characteristics of dual and triple purpose tubes, a respect in which most present testers fall short because of inadequate space for large meters. This arrangement of movements would generally afford lesser sensitivities than those previously described; however the sensitivities achievable should be ample for many purposes.

Structurally the movement comprises an inner ring 350 of non-ferromagnetic material having two or more (four are shown) studs 351 projecting radially therefrom and adjustably secured thereto. The studs terminate in core bracket portions 353 similar to core brackets shown in previous embodiments, the core bracket portions 353 having been brazed to ferromagnetic cores 354 which may be similar to those previously described.

The magnetic path is made up of as many similarly configured arc segments 355 of permeable material, as there are cores 354. At least one of these segments 355 is a permanent magnet. Depending on sensitivity requirements, some or all of the other segments 355 may also be permanent magnets.

Generally the studs 351, each bearing complete coil-core-bracket assemblies, will first be loosely coupled to the ring 350. Then the segments will be arranged on an assembly fixture in the relative position shown, the studs 351 then being drawn up evenly by the nuts 358 until the tips 356, 357 of the segments 355 are fully engaged by the core brackets 353.

The ring 350 has four non-ferromagnetic arms 359 preferably spotwelded or otherwise secured to it and projecting radially midway between the studs. Each arm has an elongated hole 360 located so as to be aligned with corresponding cored holes 361 in the magnetic segments 355. The holes 361 in the magnetic segments 355 have cored countersunk rims on the underside to permit entry of the head of the flathead assembly screws 362 which are locked in place by thin nuts 363.

Each zero adjuster assembly consists of a spring brass holder 364 having a mounting arm 381 guided by the rims 365 of arm 359 and held in place by nut 363 and screw 362. The holder is split at its terminus into fingers 366, 367 which grip the plastic insulator 368 into which the connection pins 29, 30 are driven. The holder is positioned by slot-headed cam 369 which bears against the periphery of the adjacent segments 355. This zero adjuster assembly, which would normally be used on each of the four movements, is shown only once.

External leads would be connected as shown in previous embodiments. Sensitivity adjustment of individual movements when required, would be of the wire flux leaker type (39, 40 in FIG. 1) or the helical-wire adjustable flux leaker type (41, 42, 43 in FIG. 1). This type of adjustment when applied to one movement exerts minimum influence on other movements in the multiple-movement assembly.

The scale face may present all movements with the indicating needles radiating outwardly or inwardly. One means of obtaining maximum scale length and optimum resolution on certain scales without interference between needles is shown in FIG. 20, drawn to a smaller scale than FIG. 19, in which the right and left movements have their pointers 370, 371 radiating above the scale face towards its center and reading respectively on scales 372, 373. The bottom movement has a pointer 374 that travels under the scale face 375, and across the center of the assembly, rising in step 376 through the clearance afforded by aperture 377 and reading on scale 378. The pointer 379 for the top movement is mounted on the underside of its coil, extending below the entire assembly and projecting upwardly and inwardly around rim scale 380.

Referring now to FIGS. 21, 22, 23 and 24, there is shown another form of multiple movement arrangement in accordance with this invention. The non-magnetic cross 401 has four projections 402, each adapted to receive a core 403 which is preferably brazed in place. Two plastic insulating crosses 404, 405, positioned one above and one below the cross 401, are held in place by bolt 406. In FIG. 21 the upper insulating cross 404 hides the cross 401 except for the tips of projections 402 which are slightly longer than those on the insulating cross and are soldered or brazed into the groove 407, cut vertically into the core 403. Each of the four projections 408 of the insulating cross 404 has a riser 424, the width of the riser 424 being slightly greater than that of the balance of the projection 408 adjacent thereto. Thus the edges of the risers 424 serve as stops for the coil frames 409. (Only one coil assembly is shown in FIG. 21). The holes 410 in each riser 424, also serve as guides for connection pins 411. These connection pins 411 are routed downward via tiny holes in the insulating zero adjusters 413 which are slot-headed plastic plugs inserted in the counterbored holes 414 in the cross 401. When assembled in place, the upper insulating cross 404, which has holes slightly smaller than the counterbores in the cross 401, serves as a retainer for the zero adjusters 413. The heads of the zero adjusters 413 are thicker than the depth of the counterbores in which they ride, thus they are bound against free rotation. Slight rotation of the appropriate zero adjuster 413 advances or retracts the corresponding connection pin 411, thus changing the tension on the upper coil spring 416. The lower connection pins 417 which attach to the lower springs 418 of the four movements have no adjustment. They, of course, pass snugly through the holes 410 in the risers 424 of the lower insulating cross 405.

At least one of the segments 421 is required to be a permanent magnet in order to provide flux. The other three segments 421 may be permanent magnets also, depending on sensitivity requirements, or one or more may be merely of moderate to high permeability. They are held in place together by band 422 which is secured by clamp 423. Uniformity of spacing, providing uniform air gaps, is assured by guidance of the inner edges 425 of the pole faces against the projections 402 of the cross 401. For precise setting of individual movement sensitivities, leakage adjustment means, such as 39, 40 or 41, 42, 43, previously shown in FIG. 1, are most applicable.

Figures 25, 26, 27:
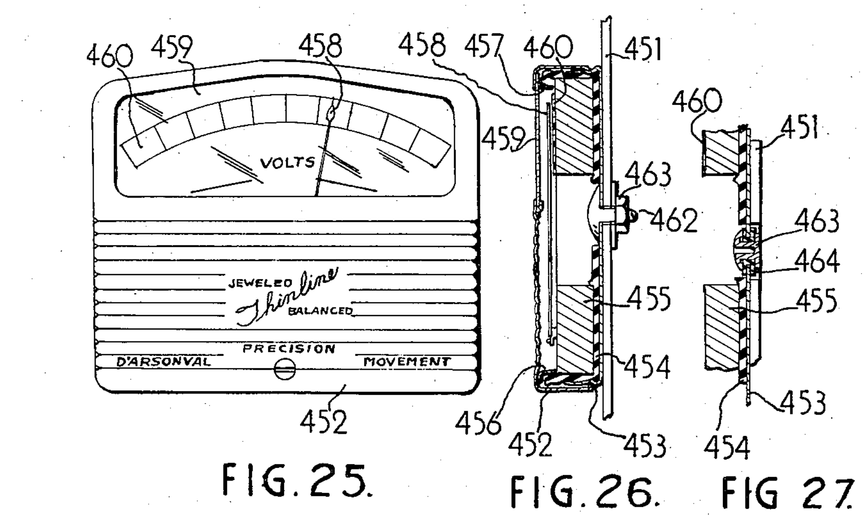
FIG. 25 is a plan view of the enclosure to a meter movement generally applicable to the single panel meters of this invention.
FIG. 26 is a cross section of the movement shown in FIG. 25.
FIG. 27 is a fragmentary sectional view of the movement of FIG. 25.

Referring now to FIGS. 25, 26 and 27, there is shown the general configuration of a single panel meter of this invention housed in a snap-on metal case consisting of cover 452 and base 453 mounted on a panel fragment 451. Normally two studs 462 would be spotwelded in place through a hole in base 453 and would be secured through the panel 451 by nuts 463. It is seen that the magnet 455, which is the structural part of the movement, is cushioned in rubber cup 454, which is provided with clearance holes for the lower end of the coil, the studs 462 and the rivet contacts 463 (only one shown in FIG. 27). The contacts 463 provide a low resistance termination. The rivet contacts 463 are insulated from the base 453 by ferrule and washer assembly 464. Wiring is omitted for clarity. Spring spacers 456 and 457 prevent accidental overtravel in assembly of the cover and interference with the movement by blows upon the cover, an extension of spacer 457 also serving as the retention frame for the window 459. The needle and scale face are indicated by numbers 458 and 460 respectively.

Figure 28:
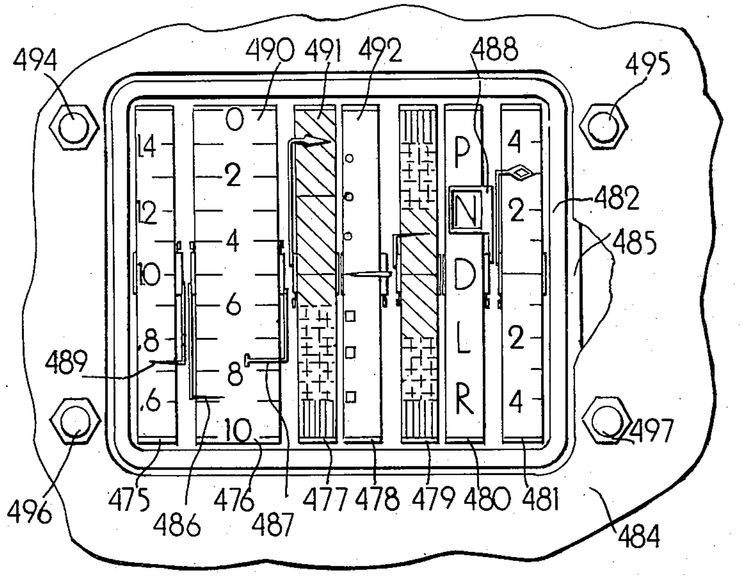
FIG. 28 is a frontal view of a set of stacked movements.

Referring now to FIG. 28, there is seen the viewing face of a set of eight stacked movements such as were shown in FIGS. 10, 14 and 15. In this view little more than the scales 475 through 481 will appear visible, thus affording an enormous amount of data in a small viewing area. The scales are visible through the molded glass cover 482, the crowned portion of which protrudes beyond the cutout opening 483 of a panel 484. The bead 485 serves as a stop for the cover against the panel. A sheet metal case (not shown) having the same area as the cover fits the cover under the bead 485.

It is not necessary to introduce a very great variety of design and color to render the scales individually distinguishable at a hasty glance. Other schemes for introducing variety are to change the designs of the pointers (compare 486, 487, and 488) to use left hand and right hand indicators (compare 486 and 489) and to provide both individual and paired scales (compare 490 with 491, 492).

The assembly of eight movements in a single case is secured to the panel by upper U bolt 494, 495 and lower U bolt 496, 497. Other methods including straps, flanges, etc. will be obvious.

Several of the methods by which the stacked movements may be assembled to each other have already been shown and discussed under the appropriate figures. These include tension bolts, clamp plates, stacking clips etc. with intermovement spacing obtained by bosses on the magnets or non-magnetic spacers between them, spacers on the bolts, clips that are keyed, etc.

As has been observed, there are many inventive keys which cooperate in enabling shrinkage of the critical dimensions that separate the "pancake" meters from the old art. The complex structures formerly built up for the purpose of providing pivotal mounting of the coil, a spring restoring force, electrical leads and electrical isolation from mechanical and magnetic components, mechanical balancing and adjustment auxiliaries etc., have all been replaced with simple straightforward means that consume little or no height beyond the minimum taken by the magnet, the coil, the needle, necessary clearances combined with shock absorption, and the case itself.

The inwardly turned pivot means accomplishes part of the job. Also highly important has been recognition of the fact that the permeability achievable in core materials enables this tiny but critical element to be substantially "hollowed out" to provide clearance for such other critical components as restoring springs, insulation and electrical leads. Any possible sensitivity loss can be made up by slight increases in the magnet thickness. Such additional height due to magnet thickening would reimpose only a tiny fraction of the critical height saved by repositioning the spring and lead-in assemblies.

When these two aims are accomplished it becomes worth while to concentrate on other inventive means for eliminating other sources contributing to undesirable height. The conventional "bird cage" type of bridge structure generally employed to span and align pole faces, mount the core, and provide mechanical balancing adjustment and electrical isolation, becomes the next target for the creative approach. The coil, if it operates at maximum efficiency, will necessarily project slightly above the magnet, and needle clearance is also essential. Therefore, why not create means substantially within the height of the coil itself for accomplishing all auxiliary purposes? This has been done.

Remembering that the mechanical balancing of the needle is normally performed by means of components above the coil and, therefore, also contributing height, it would be desirable if the balancing means might be so shifted as to contribute little or nothing in way of height to the assembly. Five different methods of accomplishing this desirable end are shown in FIGS. 1 through 5. It should be particularly noted that when the balancing means is displaced on the opposite side of the coil centerline from the indicator there is a maximum saving in weight of the rotating assembly, resulting in a lowering of inertia forces and consequent enhancement of sensitivity and rapidity of response.

Because of the inventive approach, another performance improvement is gained by the placement of resilient stop means in way of the path of the coil itself. Thus there is no requirement for outboard stops to be struck by a heavily reinforced needle or other special rotating arm that adds unwanted weight to the rotating assembly. Furthermore, there is no height contribution due to the use of such stop means.

Other inventive means for keeping down inertia and height, reducing multiplicity of parts and eliminating sources of malfunction include the low-profile coil clamps, 3, 61, 70, 80 and 90, that strengthen the coil frame at a critical point, secure the turns and facilitate balancing and the low profile conducting bands, 12 and 13, which carry the current from the springs to the coils plus the elimination of the conventional multiplicity of screws, studs, posts, washers, nuts, insulators, etc.

Other inventive techniques for directing flux and making sensitivity settings and adjustments that add little or nothing to the height of the instrument include those designated by the detail numbers: 39, 41, 43, 141, 142, 172, 174, 225, 254, 255, 256, 253, 257, 307, 308, 330, 331, 332, 333, as well as through changes in the ratio of permanent magnets to total segments in FIGS. 18 and 21.

Still another inventive means for reducing the assembly height is the elimination of the conventional bracketing enshrouding the pole piece, by means of which cores are normally positioned, with respect to the poles. One of my contributory inventive means is the bonding or locking of the pole face to an auxiliary lateral member which I have termed the core bracket. This bonding or locking can be made by means of brazing materials, solder, plastics, making notches between the pole faces and the core bracket and even by compressive stress applied to the core bracket by the pole faces.

Although for the purpose of eliminating unnecessary details in the drawings, I have chosen not to show separately the small non-remanent pole face members in which constructions of the prior art abound, it will be evident from FIG. 16 that there is no reason why the pole faces themselves must be of permanent magnet construction. The core bracket of FIG. 16 teaches that the nonmagnetic lateral coupling member or core bracket may be secured also by means of screws, since threads are easily tapped into such ductile pole face material. It might also, of course, be secured to the core by screws; however I do not prefer screws in the application because, especially for small cores, either the screw size or some desirable characteristic is likely to be compromised.

Other inventive means introduced in this application are the devices by which the zero settings of the meters are accomplished. Again it is seen that the setting means do not compromise the overall height of the assembly. Furthermore, without invoking the penalties of complexity, these means generally make it possible to provide the torque adjustment simultaneously and evenly to both top and bottom torque springs, thus eliminating the possibility of imposing asymmetric loads on the pivots. Depending on whether both springs are wound right or left hand, or whether one is wound in a different hand than the other, and perhaps with a different tension constant, very fine differential adjustments may be made.

It will be obvious that varying degrees of improvement of meter performance versus height of the assembly can be achieved over the old art without adopting all of the cooperative means shown herein to achieve maximum results. It will also be obvious that means shown in one embodiment can cooperatively function with various means in other embodiments, to produce desirable results. It will be obvious that various changes and substitutions may be made without departing from the spirit of my invention. It is obvious that abandonment of the conventional bird cage construction is one of the lessons taught herein. It is specifically requested that all of the various inventive and cooperating means herein shown and means taught thereby be granted appropriate patent protection. It is intended that claims be drawn of sufficient included scope to forbid infringement in part as well as in toto. This application seeks to protect all of the rights accruing from the novel disclosure that not only are highly significant thickness reductions achievable in D'Arsonval meters without adversely affecting performance and without shrinking the thickness of all or part of the magnet disproportionately, but also that there are many potential means of accomplishing this desirable end.

Therefore, I claim:

1. A thin meter movement of the D'Arsonval type comprising:

opposed magnetic pole members terminating in magnetic pole faces, said pole faces having been contoured as generally cylindrical segments;

a relatively small magnetically permeable core of generally cylindrical configuration positioned centrally between said pole faces, said core being of substantially the same height as that of the said pole members, said core being of smaller diameter than the distance between said segments, the annular space thereby afforded between said core and said pole faces affording a close gap for rotary movement of a coil assembly;

a coil assembly situated in said gap and spanning said core;

a non-magnetic member spanning said pole members and affixed thereto, said non-magnetic member having a central projection extending inward between said pole faces;

means bonding said core to the end of said projection;

cushion means affixed to side portions of said projection to provide stops for contacting said coil sides to prevent overtravel thereof;

internal coil pivot means and coil biasing spiral spring means located within said coil assembly, whereby said meter movement has an overall thickness substatially equal to that of said pole members, since usual end bridge structure for supporting the core, pivots, and springs is eliminated.

2. A meter movement as in claim 1, said spring means having been electrically connected at one termination thereof to a comparatively rigid member fixedly mounted with respect to said coil assembly and electrically communicating with the winding thereof, said spring having been similarly connected at its other termination to a comparatively rigid member adjustably and insulatively mounted on a lateral surface of at least one of said pole members.

3. A meter movement as in claim 1, said core having an axial recess in at least one end thereof, said recess having been proportioned for clearance of said spring means.

4. A meter movement as in claim 1, said pole faces constituting termini of a magnetic circuit having an opening in the material thereof, said opening enclosing a rotatable sensitivity adjustment means having its overall permeability in one transaxial plane greater than in the transaxial plane perpendicular thereto.

5. A meter movement as in claim 1, said coil assembly comprising a four-sided frame and a coil wound thereabout, said frame having been adapted to rotate about said pivot means, said pivot means being perpendicular to two opposite sides of said frame, one of said opposite sides having adjustable magnetic shunt means supported thereon.

6. A meter movement as in claim 1, said pole faces constituting termini of a magnetic circuit having an opening in the material thereof, said opening enclosing a rotatable sensitivity adjustment means.

7. A meter movement as in claim 1, said pole members being ends of a magnetic path, said magnetic path having an opening in the material thereof, and a rotatable sensitivity adjustment means fitted within said opening, said means having its overall permeability in one transaxial plane greater than the permeability thereof in the transaxial plane perpendicular to the first mentioned plane.

8. An instrument comprising a single magnetic continuum, said continuum including a plurality of meter movements as in claim 1 spaced in magnetic series therein.

9. A plural array of thin meter movements as in claim 1, each pair of said opposed pole members constituting termini of an individual permanent magnet means for a single one of said movements in said array, the individual permanent magnet means for the respective movements of said array having been structurally assembled to be aligned in parallel planes with sufficient clearance therebetween to admit passage as necessary of respective indicator arms for said movements, said cores and said coil assemblies for the respective movements having a common axis, said coil assemblies having individual respective indicator arms thereon, each said arm lying adjacent the respective permanent magnet means therefor;

outer scales respective to each of said movements, said scales being coaxial to said coil assemblies and arrayed in a curved cylindrical surface array, said indicator arms having each a right angled branch at their respective tips, whereby their individual movements may be read against their respective scales.

10. In a movement of the D'Arsonval type, a coil assembly comprising a four-sided frame and a coil wound thereabout, said frame having been adapted to rotate pivotably about an axis perpendicular to two opposite sides of said frame, said coil assembly having a single simple balancing weight supported on one of said opposite sides and adapted to be slidably adjusted with freedom of motion in any direction on a surface of said side and bonded to said a surface thereof.

11. A meter movement as in claim 10, said surface being that of a lateral projection extending from said side.

12. A meter movement of the D'Arsonval type, said movement including adjustment means comprising: a housing having an internal wall; a screw of relatively hard material within said housing and having its axis parallel to said wall; stop means for restraining said screw against axial motion; a relatively soft member situated between said screw and said wall; said soft member having a maximum width greater than the distance between said wall and the nearest approach of the major diameter of said screw to said wall, whereby an interference exists between the threads of said screw and the adjacent surface of said soft member; and means for preventing the rotation of said soft member, whereby rotation of said screw enforces axial movement of said soft member, said soft member having been coupled to spring means adapted for biasing said movement against rotation due ot the flow of current therewithin.

13. A meter movement of the D'Arsonval type comprising:

opposed pole members terminating in magnetic pole faces, said pole faces having been contoured as generally cylindrical segments;

a relatively small magnetically permeable core of generally cylindrical configuration positioned centrally between said pole faces, said core being of smaller diameter than the distance between said segments, the generally annular space between said core and said pole faces affording a close gap for rotary movement of a coil assembly;

a coil assembly dimensionally suitable for cooperation with said small core and close gap situated in said gap and spanning said core;

and a resilient member situated in said gap as a stop for said coil assembly, said coil assembly comprising a four sided frame and a coil wound thereabout, said frame having been adapted to rotate pivotably about an axis perpendicular to two opposite sides of said frame, said coil assembly having a single simple balancing weight lying on a relatively flat surface belonging to one of said opposite sides and adapted to be slidably adjusted with freedom of motion in any direction on said surface and bonded in adjusted position to said surface thereof.

14. A meter movement as in claim 13, having adjustable magnetic shunt means supported on one of said opposite sides of said coil assembly.

15. A meter movement of the D'Arsonval type having:

opposed pole members terminating in magnetic pole faces, said pole faces having been contoured as generally cylindrical segments;

a magnetically permeable relatively small core of generally cylindrical configuration positioned centrally between said pole faces, said core being of smaller diameter than the distance between said segments, the generally annular space between said core and said pole faces affording a close gap for rotary movement of a coil assembly;

a coil assembly dimensionally suitable for cooperation with said small core and close gap situated in said gap and spanning said core;

a resilient member situated in said gap as a stop for said coil assembly;

said movement including adjustment means comprising:

a housing having an internal wall;

a screw of relatively hard material within said housing and having its axis parallel to said wall;

stop means for restraining said screw against axial motion;

a relatively soft member situated between said screw and said wall, said soft member having a maximum width greater than the distance between said wall and the nearest approach of the major diameter of said screw to said wall, whereby an interference exists between the threads of said screw and the adjacent surface of said soft member;

and means for preventing rotation of said soft member, whereby rotation of said screw enforces axial movement of said soft member, said soft member having been coupled to spring means adapted for biasing said movement against rotation due to the flow of current therewithin.

References Cited in the file of this patent

UNITED STATES PATENTS

| | | |
|---|---|---|
| 1,824,561 | Miller | Sept. 22, 1931 |
| 1,844,529 | Stickney | Feb. 9, 1932 |
| 2,228,424 | Tonnies | Jan. 14, 1941 |
| 2,367,950 | Lenehan | Jan. 23, 1945 |
| 2,425,595 | Butler | Aug. 13, 1947 |
| 2,427,571 | Pattee | Sept. 16, 1947 |
| 2,463,770 | Huber | Mar. 8, 1949 |
| 2,509,893 | Taylor | May 30, 1950 |
| 2,854,607 | Niklas | Sept. 30, 1958 |

FOREIGN PATENTS

| | | |
|---|---|---|
| 485,611 | Germany | Nov. 2, 1929 |
| 452,440 | Great Britain | Aug. 21, 1936 |